July 25, 1939.  C. M. CONRADSON  2,166,940
HYDRAULIC POWER SYSTEM
Original Filed March 12, 1930  3 Sheets-Sheet 2
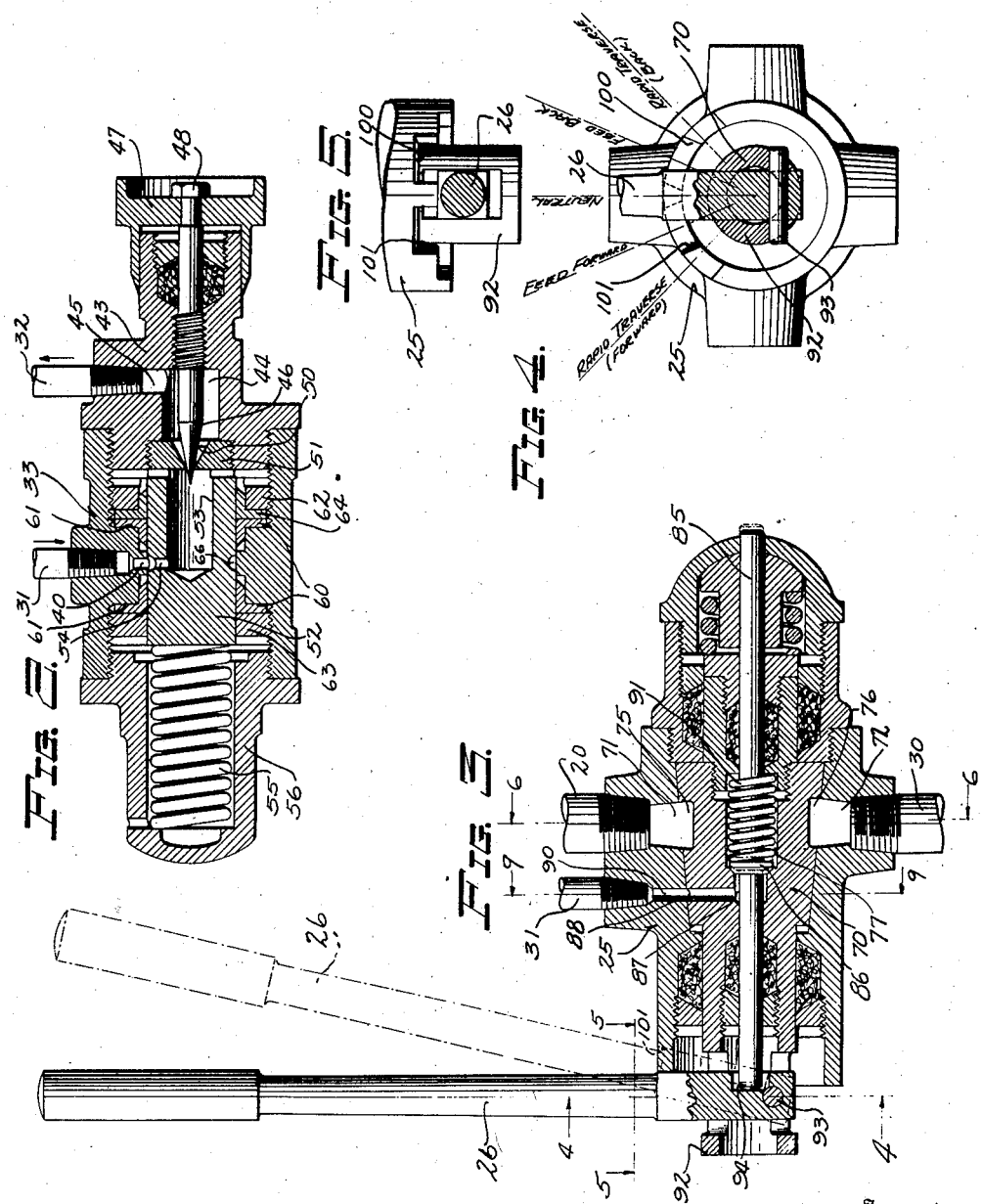
Inventor
Conrad M. Conradson
By Wheeler Wheeler & Wheeler
Attorneys July 25, 1939.  C. M. CONRADSON  2,166,940
HYDRAULIC POWER SYSTEM
Original Filed March 12, 1930   3 Sheets-Sheet 3
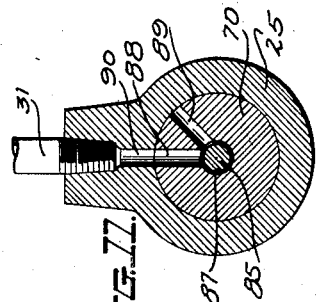
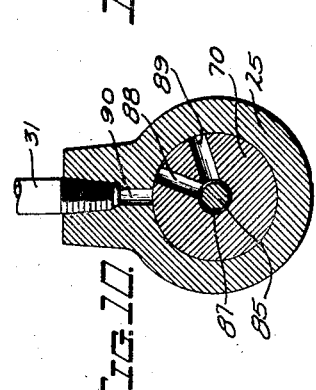
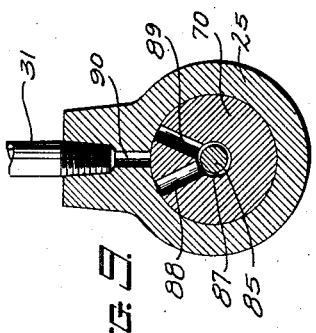
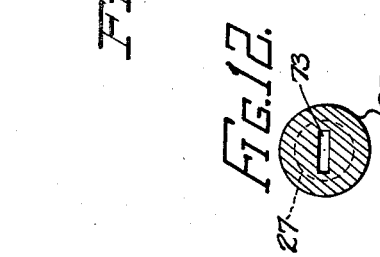
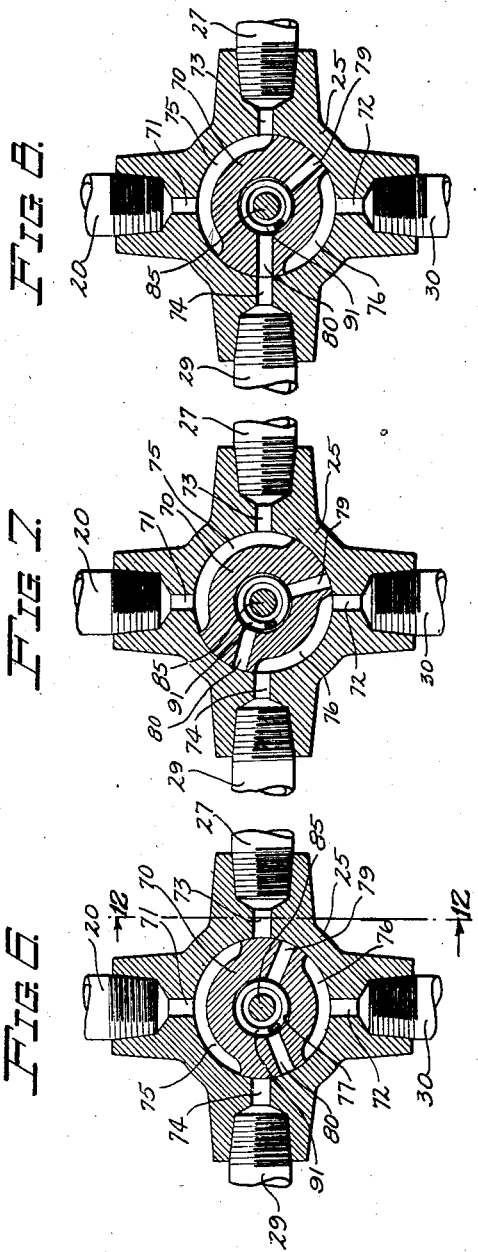
Inventor
Conrad M. Conradson
By Wheeler, Wheeler & Wheeler
Attorneys Patented July 25, 1939

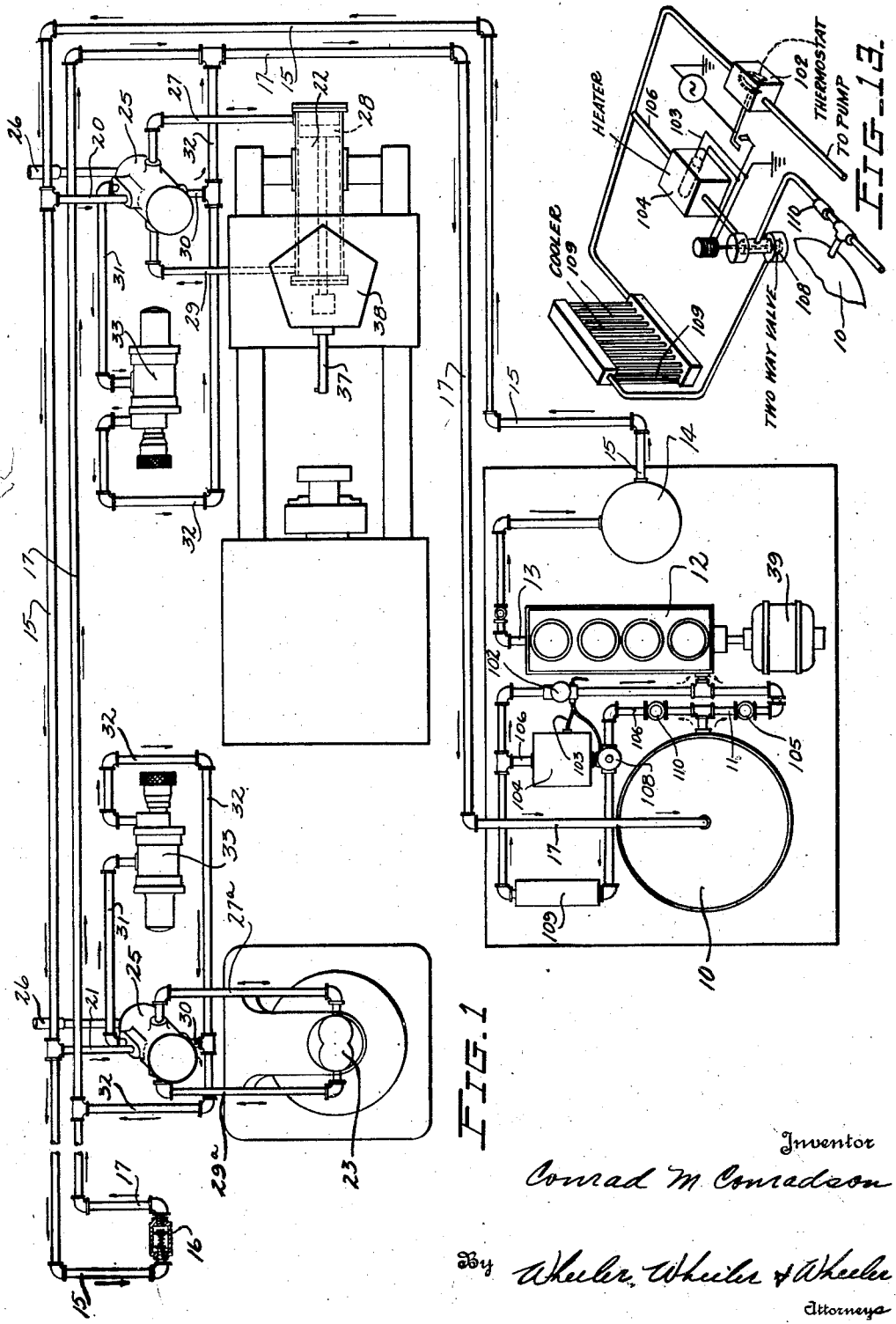

2,166,940

UNITED STATES PATENT OFFICE 2,166,940

HYDRAULIC POWER SYSTEM

Conrad M. Conradson, Detroit, Mich.

Application March 12, 1930, Serial No. 435,210
Renewed September 29, 1938

20 Claims. (Cl. 60—52)

My invention relates to improvements in hydraulic power transmitting systems.

The primary object of my invention is to provide means whereby the flow of a power liquid, such as oil, through a driven mechanism, or motor, may have its pressure and volume regulated in accordance with speed and power requirements.

More specifically stated, my object is to provide a hydraulic system in which the pressure drop of the liquid employed for power purposes may be controlled by a pressure regulating valve, and its volume controlled by a variable orifice escape valve, the organization being such that the rate of flow may be exactly predetermined in accordance with established engineering formulae for determining the rate of discharge through an aperture under a given head. My invention contemplates the use of hydraulic motors of any type, with associated supply and exhaust ducts, and any ordinary manually adjustable valve mechanism controlling the flow of the liquid in either the supply or the exhaust duct, but in addition thereto I employ a reducing valve and an associated escape valve having an orifice of variable capacity through which the rate of flow is determined by the pressure head established by the pressure regulator, thus making possible an exact control of the speed and power of a hydraulic motor.

Further objects of my invention are to devise improved valve mechanism and pressure and volume regulating mechanism suitable for accomplishing the objects above set forth; to provide means for accurately regulating the viscosity of the liquid in the system; to provide means whereby the liquid may be circulated under a pressure and in a volume on the high pressure side of the system, considerably in excess of the highest motor requirements and by-passed through motors to a low pressure or return main or delivered through a pressure regulator to a return main at the end of the supply main in a manner to permit continuous circulation regardless of the number of motors in use; to provide improved means for utilizing hydraulic power in a manner similar to that in which electrical power may be used, but with a greater range of power and speed in the individual units, to drive carriages, rotate turrets, actuate tools in quick and slow movements, operate hydraulic jacks and presses, and otherwise satisfy the requirements of a modern machine shop for varied intermittent and continuous operations suitable to be performed under hydraulic power.

In the drawings:

Figure 1 is a diagrammatic view of a portion of a hydraulic system embodying my invention, showing the central power supply station and two machines connected to receive power therefrom.

Figure 2 is a longitudinal sectional view of one of the pressure regulators employed in association with the valve mechanisms 25 conventionally illustrated in Figure 1 and used to obtain accurately controlled motor speeds.

Figure 3 is a central vertical longitudinal sectional view of manually adjustable motor controlling valve mechanisms, one of which is used to control deliveries to and from each motor and to also control delivery to one of the pressure regulators disclosed in Figure 2.

Figure 4 is a sectional view drawn to line 4—4 of Figure 3.

Figure 5 is a sectional view drawn to line 5—5 of Figure 3.

Figure 6 is a sectional view drawn to line 6—6 of Figure 3, showing the valve in a neutral position.

Figures 7 and 8 are similar views showing, respectively, the valve in rapid traverse and tool feed controlling position. Figures 9, 10 and 11 are sectional views taken respectively on the line 9—9 of Figure 3 to show another portion of the valve in the same positions of rotative adjustment in which it is illustrated in Figures 6, 7 and 8.

Figure 12 is a fragmentary sectional view drawn to line 12—12 of Figure 6, and illustrating the port 13 as seen from the inner face of the valve chamber.

Figure 13 is a perspective view illustrating conventionally the means for regulating the temperature of the power liquid to maintain uniform viscosity.

In the diagram shown in Figure 1, power liquid is drawn from a reservoir 10 through a valved pipe or duct 11 to the suction side of the pump 12, the outlet 13 of which is connected to an accumulator 14.

From the accumulator, the liquid is delivered to a supply main 15 which conveys it to various machines and machine parts to be driven by hydraulic power. At its outer end this pipe 15 may be provided with an ordinary spring actuated check valve 16, which will serve as a safety valve to open under excess pressure and allow the liquid to enter a return pipe 17 which reconveys it to the reservoir 10.

At various points along the line of the main 15 branch ducts 20—21 are employed to deliver the power liquid to hydraulic motors 22—23, such delivery being in each case regulated by suitable manually controlled valve mechanism, the casings 25 of which clearly appear in Figure 1.

One of the valve mechanisms 25 indicated in Figure 1 and hereinafter more specifically described is employed to regulate both the delivery to and the exhaust from, a motor 22, which has a reciprocatory piston 28 to be driven by the liquid. In one position of the controlling lever 26, the valves are adjusted so that the liquid passes freely to one end of the motor cylinder 22 through a pipe 27 and exhausts from the other end through the pipe 29, and one of the valve ports, to pipes 30 and 32, and thence to the return or low pressure main 17. In another position of lever adjustment, the exhaust, (and the speed of the motor), is additionally controlled by cutting off deliveries through pipe 30 and directing the liquid through a pipe 31 connected with the casing member 33 of an associated pressure and volume regulator, the structure and mode of operation of which is hereinafter described.

The motor indicated at 23 may be assumed to be a rotary hydraulic motor such, for example, as a gear motor. But further description of the motors is deemed unnecessary since the structural features of the motors form no part of the invention and means for controlling the speed of operation will be the same regardless of the type of motor used. It may be assumed, however, that the motor 22 may be employed to reciprocate a boring bar 37 or any other tool carried by the turret 38 and it may also be assumed that the motor 23 may be employed to operate a drill or any other tool revoluble about a vertical axis regardless of whether such tool does or does not reciprocate vertically as hereinafter set forth in the detailed description thereof, each of the valve mechanisms 25 (Figures 3, 6, and 9) has a neutral, i. e., a fully closed position, so that when adjusted to such position by the lever 26 no liquid will be delivered to the associated motor. However, the pump 12 may, if desired, be continuously driven by its motor 39 or from any other suitable source of power, whereby hydraulic power will be continuously available to any machine connected with the main 15.

In order that the means for controlling the operations of the motor may be clearly understood, the structure of the regulator at 33 will now be described, after which the structure of the valve mechanism will be set forth in detail and the co-operation therewith of this pressure and volume regulator will be explained.

The structure of the regulator at 33 is clearly shown in Figure 2.

The cylindrical casing member 33 has a radial inlet port 40, with which the pipe 31 communicates. Into one end of this casing member 33 a head 43 is screwed, which has an outlet cavity 44 in communication with the pipe 32 through a port 45. The head 43 carries a needle valve 46, the stem of which is threaded axially into the head at one end of the cavity 44 and has its outer end keyed to a rotatable cap 47 and secured thereto by a nut 48. The needle valve 46 seats in a conical port 50, preferably formed in a nut 51 which is screwed into the inner end of the head 43 and forms the inner end of the cavity 44.

A cylindrical slide valve 52 is mounted within the casing member 33 and the end facing the outlet port 50 is provided with an axial bore 53, which, with the space between this valve and the head 43, forms a pressure accumulating cavity.

At the inner end of the bore 53 there is a radially extending port 54 in a position for normal registry with the inlet port 40. A coiled compression spring 55 is socketed in the cap 56 and tends to urge the slide valve 52 in the direction of the outlet port 50, but the pressure of the liquid admitted through the registering inlet ports 41 and 54 tends to urge the valve 52 in the opposite direction. When this pressure exceeds that exerted by the spring 55, the valve 52 will progressively close the port 41 until the flow of liquid through this port balances the outflow permitted by the needle valve.

Therefore, the needle valve may be adjusted to precisely regulate the rate of liquid delivery, since the flow of the liquid through an aperture of a given capacity and under a given pressure will be equal at all times unless there is a change in viscosity, in which event a re-adjustment of the needle valve would be required. However, my invention includes means for maintaining a uniform viscosity as will be hereinafter explained.

To facilitate assembly, suitable packing rings 60 are seated against the shoulders formed by a central inwardly projecting portion 61 of the casing member 33. The end portions of the casing member are threaded internally to receive the packing nuts 62 and 63 and on the outlet side. Oppositely faced packing rings 60 and 64 are preferably employed. After these parts have been assembled the head 43 and cap 56 are screwed into the respective ends of the casing 33 to complete the assembly.

Unless means are provided by key or otherwise to prevent the slide valve 52 from rotating, this valve should have an annular groove 66 in registry with the port 54 whereby the liquid may enter the port 54 from the port 40, regardless of whether the ports 41 and 54 are radially aligned. The rate of flow through the port 40 will be proportional to the area of its own outlet as determined by longitudinal movements of the slide valve 52. The relative capacity of this opening as compared with that controlled by the needle valve will, of course, determine the degree of pressure that may be built up within the cavity 53 and thus make possible volumetric control by means of the needle valve as long as excess pressure is maintained in the tank 10, since the pressure at the needle valve is regulated by its associated pressure regulating valve 52.

As above explained, the use of the pressure and volume regulator is dependent upon a specific adjustment of the controlling lever 26, whereby the main valve mechanism may be utilized to connect up the regulator at 33 and shut off direct delivery of the exhaust from the motor through the pipe 30. This main valve mechanism will now be described.

The casing member 25 is ported in four directions in the plane represented by the line 6—6 in Figure 3. Each of these ports is preferably in the form of a slot, rectangular in cross section and extending longitudinally of the casing, whereby a uniform rate of shut-off may be obtained by a rotary plug valve 70 within the casing. It will be obvious that the effective area of a rectilinear port will be exactly proportioned to the movement of the valve across the port from one of its side walls, whereas if the port is circular the area cut off by any given movement of the valve progressively increases until the valve crosses a center line of the port parallel with the advancing edge of the valve, after which the rate of shut-off for any given degree of valve rotation will progressively decrease. In the construction shown, the port 71 is the inlet port, this being connected with one of the branch pipes 20 or 21 shown in Figure 1. The port 72, directly opposite the port 71, is the direct flow outlet port connected with the pipe 30, and associated with the return main 17. The two side ports 73 and 74 are connected to the motor and are adapted to serve as either supply or exhaust ports, dependent in any given instance on the direction of the motor operation.

The rotary valve 70 is preferably of the taper plug type and as clearly appears in Figures 6, 7, and 8, it has oppositely disposed arcuate cavities 75 and 76 in its peripheral surface and it is also provided with an axial cavity 77 from which two radial ports 79 and 80 extend to the periphery.

In Figure 3 it will be observed that a rod 85 extends axially through the cavity 77 in the rotary valve 70 and is provided with an annulus which serves as a check valve 86 and normally separates this cavity 77 from a cavity 87 of smaller diameter in communication with two radial ports 88 and 89, one of which appears in Figure 3, but both of which are shown in Figures 9, 10 and 11. These ports 88 and 89 are adapted for independent registry with a port 90 in communication with the pressure regulator inlet through the pipe 31. A coiled compression spring 91 tends to hold the valve 86 to its seat on the tapered shoulder formed at the junction of the cavity 77 with the cavity 87, whereby delivery of liquid through the ports 88, 90 and pipe 31 is normally prevented.

The stem 92 of the rotary valve 70 has its projecting end slotted to receive the working end of the lever 26 and the lever is pivoted to the stem by means of a cross pin 93 located on the opposite side of the valve axis from that occupied by the lever handle. The lever has its inner face recessed at 94 to receive the end of the rod 85 and when the lever is swung upon the pivot pin 93, this rod 85 may be actuated to open the check valve 86. When the lever is swung rotatively the rotary valve 70 may be adjusted in the manner now to be described.

As shown in Figures 6 and 9, the cavity 75 is in registry with the inlet port 71 but with no other port, and the cavity 76 is in registry with the outlet 72 but with no other port. The radial ports 79 and 80, 88 and 89, are closed at their outer ends. With the valve in this position no liquid can pass through the casing. This is the normal or neutral position.

Assuming the valve 70 controlling deliveries to the motor 22, (Fig. 1), to be in the neutral position in which it is illustrated in Figures 6 and 9, it is obvious that if it is rotated in a clockwise movement to the position in which it is indicated in Figures 7 and 10, liquid from the main 15 will be received through the pipe 20 and delivered through the valve cavity 75 and pipe 27 to the right hand end of the motor cylinder 22. Liquid from the left hand end of the cylinder 22 will simultaneously exhaust freely through the pipe 29, valve cavity 76, and pipes 30 and 32 to the return main 17. In this position of the valve 70, the piston 28 of the motor 22 will be moved rapidly to the left, producing rapid traverse of the carriage 36 and tool 37, the only limiting factor being the capacity of the ports and connecting pipes unless the valve is carefully adjusted to only partially open the ports.

But as the tool approaches the work, the lever 16 may be reversely actuated to rotate the valve in the opposite direction (counter-clockwise) until the valve reaches the position in which it is illustrated in Figures 8 and 11. In that position, its arcuate cavity 75 will still connect the ports 71 and 73 to continue the delivery of liquid to the right hand end of the cylinder 22.

But it will be observed in Figure 8 that cavity 76 will then be in registry only with port 72. The radial port 80 will be in registry with the port 74 and the pipe 29 will therefore be in communication with the central or axial valve cavity 77 from which liquid cannot escape until the lever 16 is swung upon the pivotal axis 93 in a plane at right angles to its above described movement of rotation, the lever being then brought to the dotted line position indicated in Figure 3. This lever movement actuates rod 85, opens the valve 86, and allows the liquid to flow from the cavity 77 into the extension cavity 87 and thence through the registering ports 88 and 90 and pipe 31 to the pressure and volume regulator, where its pressure is regulated by the slide valve 52, and its rate of flow determined by the needle valve 46. With a rate of flow thus predetermined by the setting of the needle valve it reaches the return duct 32 through the port 45.

By thus controlling the volume of liquid returned from the exhaust side of the piston of motor 22, the motion of the latter may be accurately controlled by adjustment of the needle valve in accordance with the tool feeding requirements of any tool carried by the turret.

For retraction of the tool the lever 26 will first be swung to its neutral or upright position, thereby stopping the motor by closing the valve 86. By then swinging the lever to move the valve in a counter-clockwise direction from the position in which it is illustrated in Figure 7, its port 75 may be brought into simultaneous registry with the ports 71 and 74, thus reversing the flow of liquid from port 71 to the motor by delivering it through the ports 74 and pipe 29 to the left hand of the cylinder 22. In this position of the valve it is obvious that the liquid will then be allowed to freely pass from the right-hand end of the motor through the pipe 27, port 73, and valve cavity 76 to port 72 and the return ducts or pipes 30 and 32 which lead to the return main 17.

If it is desired to limit the speed during the reverse operation of the motor 22, i. e. the movement of its piston to the right as illustrated in Figure 1, this can be done by stopping the movement of the lever 16 from neutral position in the counter-clockwise direction when the valve port 79 is brought into registry with the casing port 73 and then moving the lever to an inclined position similar to that in which it is indicated by dotted lines in Figure 3, whereupon liquid will be permitted to return through the pipe 27, ports 73 and 79, the axial cavities 77, 87, 89 and 90 and through the pressure and volume regulator (Fig. 2).

The end of the valve casing 25 is notched at 100 and 101 (Fig. 4) to receive the lever at the intermediate stages of its rotative stroke, when one of the ports 79 or 80 of the rotary valve 70 is in registry with its associated casing port 73 or 74. It is necessary that the lever be adjusted in one of these positions before it can be swung to an inclined position as indicated by dotted lines in Figure 3 and thus open valve 86 to connect up the pressure and volume regulator for control of the speed of the motor.

From the foregoing description it will be obvious that like valve mechanisms and pressure and volume regulators may be employed to control the operation of a hydraulic motor of any type, since means are provided for controlling delivery of the hydraulic fluid in volume and at a pressure to satisfy full speed requirements of the motor in either direction and to exactly control the speed of the motor by a pressure and volume regulator of the type described.

If a rotary motor is employed as indicated at 23 in Figure 1, the power liquid may be delivered to the motor through the pipe 27a and exhausted through the pipe 29a exactly as above described with reference to the pipes 27 and 29 associated with the motor 22. Also the flow of liquid through these pipes 27a and 29a may be reversed to reverse the operation of the motor 23 in the same manner that the operation of motor 22 is reversed as above described.

It may be desirable to maintain a uniform viscosity of the power liquid in order to avoid the necessity of changing the adjustment of the needle valve 46 in accordance with changing viscosity due to changes in temperature. If there is no change in viscosity or density the liquid under a given pressure in the cavity 53 of the pressure and flow regulator will at all times have an exactly controlled rate of flow past the needle valve 46 in any given adjustment of that valve. The density will not ordinarily vary where oil is used as the hydraulic agent and viscosity of the liquid will be uniform if a uniform temperature is maintained. This can be easily accomplished by employing heating and cooling means through which the liquid may be alternatively directed by means of a thermostatically controlled valve which is adapted to direct the liquid through the heater when the temperature of the liquid is below the desired degree, and to direct it through a radiator or cooler when the temperature is above the desired degree. This means for controlling the temperature and correspondingly controlling the viscosity is illustrated most clearly in the conventional diagram, Figure 13, and is described as follows:

Where temperature control is desired, the valve at 105 in the pipe 11 may be closed and the liquid supplied to the pump through the pipe 106, this pipe extending through an electrical heating chamber 104. A thermostat at 102 may be employed to control an electrical circuit of the heater through the lead 103 when the temperature of the oil falls below that predetermined by the setting of the thermostat.

If desired, or if conditions require, the thermostat may also be employed to control an electrical circuit through the coil of an electromagnetically operated valve at 108, whereby, when the temperature rises above the desired limit the valve at 108 may be automatically adjusted to by-pass the power liquid through a radiator indicated at 109. A valve at 110 may be employed to shut off the flow of the power liquid through pipe 106 when the valve at 105 is open.

The use of thermostats to alternately control the operation of electro-heaters and electromagnets is well understood and detailed explanation and description is deemed unnecessary.

I claim:

1. The combination with a reservoir for power liquid provided with means for maintaining the liquid at a substantially constant viscosity, a supply main, a hydraulic motor having its inlet connected with said main, a pump having its inlet connected with the reservoir and its outlet connected with said supply main, said pump being adapted to deliver power liquid to the main under pressure in excess of motor requirements, a pressure regulator having its inlet connected with the exhaust port of the motor and its outlet connected with said reservoir, a volume controlling valve at the pressure regulator outlet, said pressure regulator being adapted to maintain a constant pressure between it and said volume controlling valve and said volume controlling valve being adapted to allow delivery of liquid of uniform viscosity at a uniform rate, and a manually operable valve mechanism for selectively directing the liquid from the motor exhaust port through the pressure regulator or by-passing it directly to the reservoir, the pressure in said reservoir being maintained at a constant pressure below that at which the liquid is delivered to the motor.

2. A hydraulic motor having a circulatory system for power liquid in combination with means for maintaining the power liquid under pressure in excess of the requirements of the motor, means for automatically maintaining the liquid at a substantially constant temperature and viscosity, and a pressure regulator connected with the motor outlet and having its outlet provided with a manually adjustable valve controlling the rate of flow from the low pressure side of the regulator, said pressure regulator being adapted to control the pressure of the liquid between it and said valve, and the valve being adapted to provide an orifice of predetermined capacity for liquid of a given viscosity, whereby the speed of the motor may be accurately controlled.

3. A hydraulic motor having a circulatory system for motor operating power liquid subject to variations in pressure at the point of delivery to the motor, said system being provided with means for maintaining pressure in excess of the motor requirements, a pressure regulator in said system adapted to be connected to receive liquid from the motor outlet, a volume controlling valve in the pressure regulator outlet, said pressure regulator being adapted to maintain a constant pressure of the liquid between it and said valve, and the valve being adapted to provide an orifice of predetermined capacity for liquid of a given viscosity, manually adjustable valve mechanism, adapted, in one position, to direct power liquid from the motor outlet through said pressure regulator on its return to the source of pressure supply and in another position to by-pass such liquid to said source of pressure supply around the pressure regulator, and means for maintaining said liquid at a substantially constant viscosity.

4. The combination with a hydraulic motor having a circulatory system for motor actuating power liquid and a pump for supplying liquid to the system under a pressure in excess of motor requirements, the combination with a set of return ducts connecting the motor outlet with said pump, a pressure regulator interposed in one of said ducts, a volume controlling, adjustable valve in the pressure regulator outlet, said pressure regulator being adapted to maintain a constant pressure of the liquid between it and said valve, and the valve being adapted to provide an orifice of predetermined capacity for liquid of a given viscosity, and valve mechanism for directing the exhaust liquid from the motor selectively through the duct containing the pressure regulator, and the other return duct 5. A hydraulic motor having a circulatory system for a motor actuating power liquid, means for maintaining the liquid in the motor supply side of said system at a pressure in excess of motor requirements, a plurality of pipe connections between the motor outlet and the return side of the system, manually operated valve mechanism for selectively directing the exhaust from the motor through either of said pipe connections, means associated with one of said pipe connections for precisely controlling the rate of flow of the liquid therethrough while under a predetermined viscosity, and means for maintaining said liquid at a predetermined viscosity.

6. The combination with a source of liquid supply under pressure, of a hydraulic motor connected with the source of supply and provided with branched outlet ducts, a valve for selectively controlling deliveries of power liquid from the motor through the respective branches of the outlet ducts, a pressure regulator in one of said outlet ducts having its outlet provided with a valve for regulating the rate of delivery from the motor, said pressure regulator being adapted to maintain a constant pressure of the liquid between it and said second valve, and the second valve being adapted to provide an orifice of predetermined capacity for liquid of a given viscosity, a rotary valve cooperative with the first mentioned valve for controlling delivery of liquid to and from the motor, and a lever movable in different planes and connected to adjust one valve when moved in one plane and the other valve when moved in another plane.

7. The combination with a source of liquid supply under pressure, of a hydraulic motor operative at less pressure than that maintained in the source of liquid supply, a valve controlling deliveries of power liquid from the source of supply to and from the motor, a pressure regulator having an outlet provided with a volume controlling valve, a valve for directing liquid from the motor outlet to the pressure regulator, said pressure regulator being adapted to maintain a constant pressure of the liquid between it and said volume controlling valve, and the volume controlling valve being adapted to provide an orifice of predetermined capacity for liquid of a given viscosity, and a lever movable in different planes and connected to adjust the first mentioned valve independently of the one controlling delivery to the pressure regulator, the first mentioned valve and its seat having ports adapted in one position of the valve to direct power liquid from the motor through the pressure regulator, and in another position directly to the source of supply, said first valve having associated ports, one communicating with the pressure regulator and the other communicating directly with the source of supply.

8. The combination of a hydraulic motor, power liquid supplying means, means for maintaining a circulating liquid supply under pressure in excess of that required for operation of the motor and at substantially constant viscosity, a pressure regulator valve casing connected with the motor outlet and having inlet and outlet cavities, a pressure regulating valve in said casing controlling deliveries from the inlet to the outlet cavity, said casing having an outlet port provided with a manually adjustable volume controlling throttle valve, said pressure regulator being adapted to maintain a constant pressure of the liquid between it and said valve, and the throttle valve being adapted to provide an orifice of predetermined capacity for liquid of a given viscosity, and a duct leading from said outlet to the source of liquid supply.

9. In a motor operating hydraulic system, the combination with a motor having motor supply and exhaust ducts, of a pump for circulating power liquid through said system, adapted to maintain the supply duct under pressure in excess of motor requirements, a pressure regulator interposed in the exhaust duct of the motor and provided with a valve in the pressure regulator outlet for controlling the volume of liquid passing therethrough, said pressure regulator being adapted to maintain a constant pressure of the liquid between it and said valve, and the valve being adapted to provide an orifice of predetermined capacity for liquid of a given viscosity, and thermostatically controlling means for automatically maintaining said liquid at a predetermined temperature and viscosity, whereby the speed of the motor and the quantity of liquid withdrawn from the high pressure side of the system may be accurately controlled and made precisely continuous as to rate of movement.

10. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure, and means responsive to variations in said back pressure for varying the resistance to said discharge of liquid inversely to variations in motor load to thereby maintain the speed of said motor substantially constant under varying loads.

11. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure, means responsive to variations in said back pressure for varying the resistance to said discharge of liquid inversely to variations in motor load to thereby maintain the speed of said motor substantially constant under varying loads, and means for by-passing said discharge liquid around said throttling means to permit said motor to operate at high speed.

12. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure and to maintain the speed of said motor at a given uniform rate under a given maximum motor load, and means responsive to an increase in said back pressure for adding additional resistance to said discharge of liquid in proportion to said increase in back pressure to thereby maintain the speed of said motor at substantially said uniform rate under any load less than said maximum.

13. The combination with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure and to maintain the speed of said motor at a given uniform rate under a given maximum motor load, and means connected between said motor and said throttling means and responsive to an increase in said back pressure for adding additional resistance to said discharge of liquid in proportion to said increase in back pressure to thereby maintain the speed of said motor at substantially said uniform rate under any load less than said maximum.

14. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising a choke connected to said motor and providing a resistance to the discharge of liquid therefrom to thereby create in said motor a back pressure and to maintain the speed of said motor at a given uniform rate under a given maximum motor load, and means for controlling the flow of said discharge liquid to said choke and responsive to variations in said back pressure to control said flow and cause said discharge liquid to enter said choke at a controlled pressure whereby said liquid flows through said choke at a substantially uniform rate throughout the entire range of variation in back pressure and motor load.

15. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure and to maintain the speed of said motor at a given uniform rate under a given maximum motor load, means responsive to an increase in said back pressure for adding additional resistance to said discharge of liquid in proportion to said increase in back pressure to thereby maintain the speed of said motor at substantially said uniform rate under any load less than said maximum, and valves connected in circuit with said motor for enabling it to operate at high speed in either direction.

16. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure and to maintain the speed of said motor at a given uniform rate under a given maximum motor load, means connected between said motor and said throttling means and responsive to an increase in said back pressure for adding additional resistance to said discharge of liquid in proportion to said increase in back pressure to thereby maintain the speed of said motor at substantially said uniform rate under any load less than said maximum, and valves connected in circuit with said motor for enabling it to operate at high speed in either direction.

17. The combination with a hydraulic motor for moving a variable load and means for delivering liquid continuously to said motor in adequate volume and at a sufficient pressure to operate the same, of means for controlling the discharge of liquid from said motor to thereby maintain its speed constant, comprising a choke connected to said motor and providing a resistance to the discharge of liquid therefrom to thereby create in said motor a back pressure and to maintain the speed of said motor at a given uniform rate under a given maximum motor load, means for controlling the flow of said discharge liquid to said choke and responsive to variations in said back pressure to control said flow and cause said discharge liquid to enter said choke at a controlled pressure whereby said liquid flows through said choke at a substantially uniform rate through the entire range of variation in back pressure and motor load, and valves connected in circuit with said motor for enabling it to operate at high speed in either direction.

18. In a motor operating hydraulic system, the combination with a motor having motor supply and exhaust ducts, of a pump for circulating power liquid through said system, adapted to maintain the supply duct under pressure in excess of motor requirements, and a flow regulating control means interposed in the exhaust duct of the motor, said control means comprising an orifice of predetermined size and a pressure regulating valve associated with said orifice, said valve including a variable orifice and automatic means responsive to pressure variations at one end of said first orifice for varying the size of the second orifice.

19. In a motor operating hydraulic system, the combination with a motor having motor supply and exhaust ducts, of a pump for circulating power liquid through said system, adapted to maintain the supply duct under pressure in excess of motor requirements, and a flow regulating control means interposed in the exhaust duct of the motor, said control means comprising an orifice of predetermined size and a pressure regulating valve in series with said orifice, said valve including a variable orifice and automatic means responsive to pressure variations at one end of said first orifice for varying the size of the second orifice.

20. In a motor operating hydraulic system, the combination with a motor having motor supply and exhaust ducts, of a pump for circulating power liquid through said system, adapted to maintain the supply duct under pressure in excess of motor requirements, a flow regulating control means interposed in the exhaust duct of the motor, said control means comprising an orifice of predetermined size, and pressure regulating means for maintaining a predetermined pressure drop through said orifice.

CONRAD M. CONRADSON.